United States Patent
Martin

(10) Patent No.: US 6,484,483 B2
(45) Date of Patent: Nov. 26, 2002

(54) LAWN SWEEPER AND BAGGER

(76) Inventor: Jerry L. Martin, 6387 Dove St., Norfolk, VA (US) 23513

(*) Notice: Subject to any disclaimer, the term of this patent is extended or adjusted under 35 U.S.C. 154(b) by 0 days.

(21) Appl. No.: 09/804,382

(22) Filed: Mar. 13, 2001

(65) Prior Publication Data

US 2002/0129589 A1 Sep. 19, 2002

(51) Int. Cl.[7] .............................................. A01D 87/10
(52) U.S. Cl. ...................... 56/12.8; 56/16.7; 15/415.1
(58) Field of Search .................... 56/12.8, 13.3, 56/16.4 R, 16.6, 16.7, 16.8; 15/347, 415.1

(56) References Cited

U.S. PATENT DOCUMENTS

| | | | | |
|---|---|---|---|---|
| 929,066 A | * | 7/1909 | Williams | 15/415.1 |
| 1,483,848 A | | 2/1924 | Hand et al. | |
| 1,844,785 A | | 2/1932 | Nelson | |
| 2,436,011 A | | 2/1948 | Lucas | |
| 2,534,189 A | * | 12/1950 | Wright | 15/415.1 |
| 2,538,643 A | | 1/1951 | Gregory | |
| 2,700,863 A | | 2/1955 | Etem | |
| 2,905,963 A | | 9/1959 | Boyer | |
| 2,930,068 A | | 3/1960 | Evanson et al. | |
| 2,984,961 A | | 5/1961 | Judkins | |
| 3,358,315 A | * | 12/1967 | Bennett | 15/415.1 |
| 3,744,653 A | * | 7/1973 | Jensen | 15/347 |
| 3,790,986 A | * | 2/1974 | Burger | 15/347 |
| 3,802,025 A | * | 4/1974 | Berg | 15/347 |
| 4,475,265 A | * | 10/1984 | Berfield | 15/415.1 |
| 4,564,972 A | * | 1/1986 | Varin | 15/415.1 |
| 5,119,619 A | | 6/1992 | Zappia | |
| 5,226,757 A | * | 7/1993 | Tarrant | 15/347 |
| 5,245,723 A | * | 9/1993 | Sommer | 15/347 |
| 5,685,134 A | * | 11/1997 | Thornburg | 56/16.6 |
| 5,870,889 A | * | 2/1999 | Togoshi et al. | 56/13.3 |
| 6,226,970 B1 | * | 5/2001 | Busboom et al. | 56/16.6 |

* cited by examiner

Primary Examiner—Robert E. Pezzuto
Assistant Examiner—Nathan Mammen
(74) Attorney, Agent, or Firm—Shlesinger Arkwright & Garvey LLP

(57) ABSTRACT

A lawn sweeper and bagger which increases the efficiency of the device by utilizing a Bernoulli Effect to increase the pickup capabilities of the device and which also permits handling of the bags more readily by positioning them on the front rather than on the rear of the machine.

13 Claims, 4 Drawing Sheets

LAWN SWEEPER AND BAGGER

GENERAL DESCRIPTION

This invention relates to a lawn sweeper and bagger in which the bags are mounted in front of the suction-blower motor assembly and includes means in the leaf pick-up which creates a Bernoulli Effect by positioning a wedge of diamond shape to increase the speed of the materials moving into the suction-blower motor assembly for more effective debris pickup.

HISTORICAL BACKGROUND

In the past, a number of devices have been developed for removing debris from lawns and the like. Lucas U.S. Pat. No. 2,436,011 provided a vacuum pickup which mulched or pulverized the leaves.

Eten U.S. Pat. No. 2,700,863 discloses a device which will pick up the debris and incinerate the debris. Similarly, Boyer U.S. Pat. No. 2,905,963 incinerates but also provides means for collecting the material into a bag.

A number of early developments involve mulching of the material including Gregory U.S. Pat. No. 2,538,643 and Judkins U.S. Pat. No. 2,984,961 who can mulch or bag as desired.

Bag pickup devices are shown in Evanson U.S. Pat. No. 2,930,068 and Nelson U.S. Pat. No. 1,844,785. Nelson is a cotton picker device with more than one nozzle.

Blowers for blowing the leaves in one direction are common and a carrier for such a blower is noted in Zappia U.S. Pat. No. 5,119,619. Hand U.S. Pat. No. 1,483,848 shows the idea of providing a vacuum pickup for cotton which delivers the material into a pair of bags.

Of general interest, also is Finn U.S. Pat. No. 2,990,019.

Where bagging is used, the positioning of the bag has typically been at the rear of the device as generally shown in the patents providing bags. Refer to the above.

OBJECTS AND SUMMARY

It is an object of this invention to provide a lawn sweeper and bagger which positions the bag or bags on the front rather than on the rear of the machine for ease of access.

Yet another object of this invention is to provide a lawn sweeper which will be more efficient in handling the debris coming into the pickup.

Still a further object of this invention is to provide a lawn sweeper and bagger which can be easily and inexpensively manufactured.

Yet a further object of this invention is to provide a lawn sweeper and bagger which requires a minimum of effort during operation of the device.

In summary this invention pertains to a lawn sweeper and bagger which increases the efficiency of the device by utilizing a Bernoulli Effect to increase the pickup capabilities of the device and which also permits handling of the bags more readily by positioning them on the front rather than on the rear of the machine.

These and other objects of the invention will be apparent from the following description and drawings noted as follows.

DESCRIPTION

Figure 1:
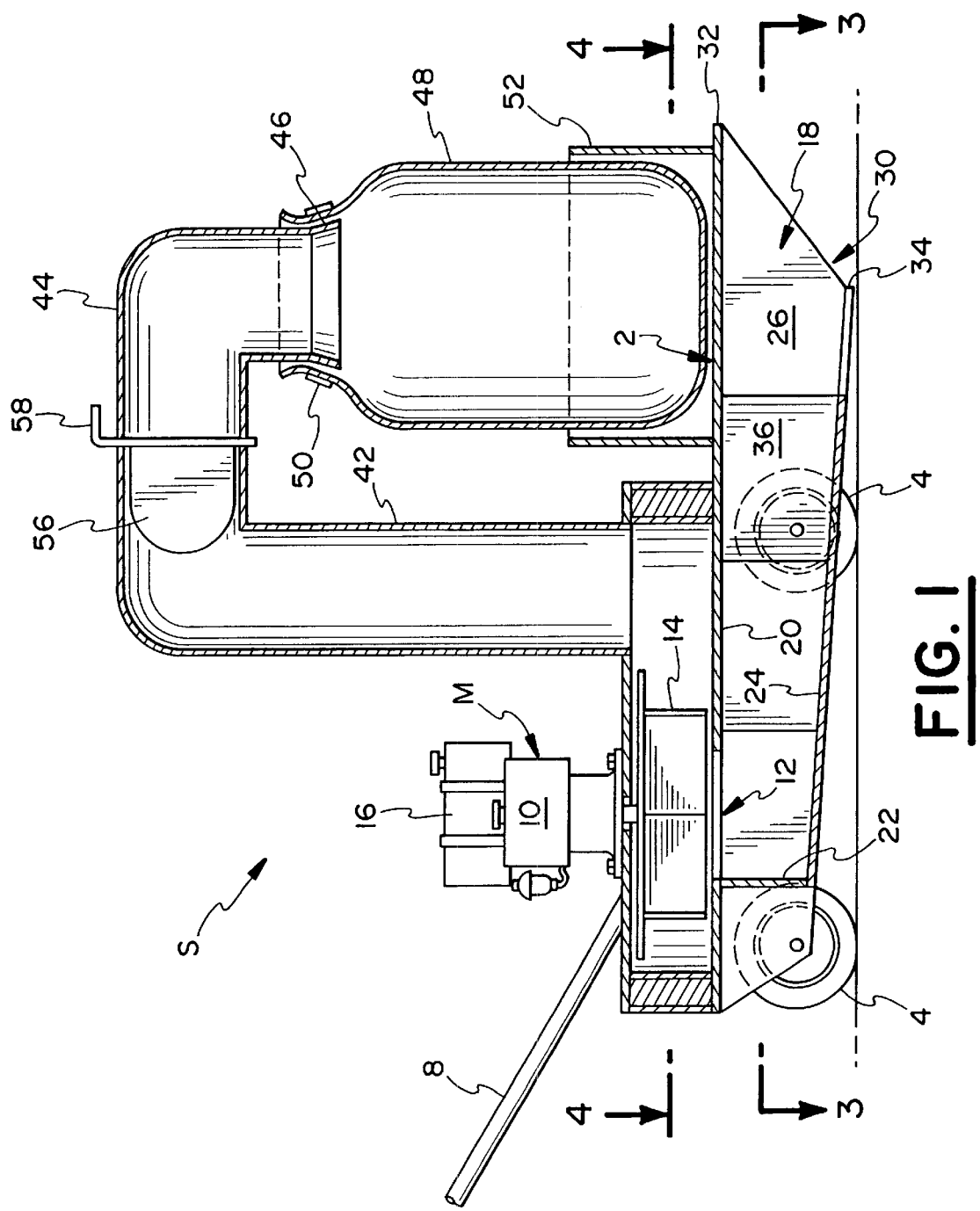
FIG. 1 is a cross sectional side elevational view of the invention.
Figure 2:
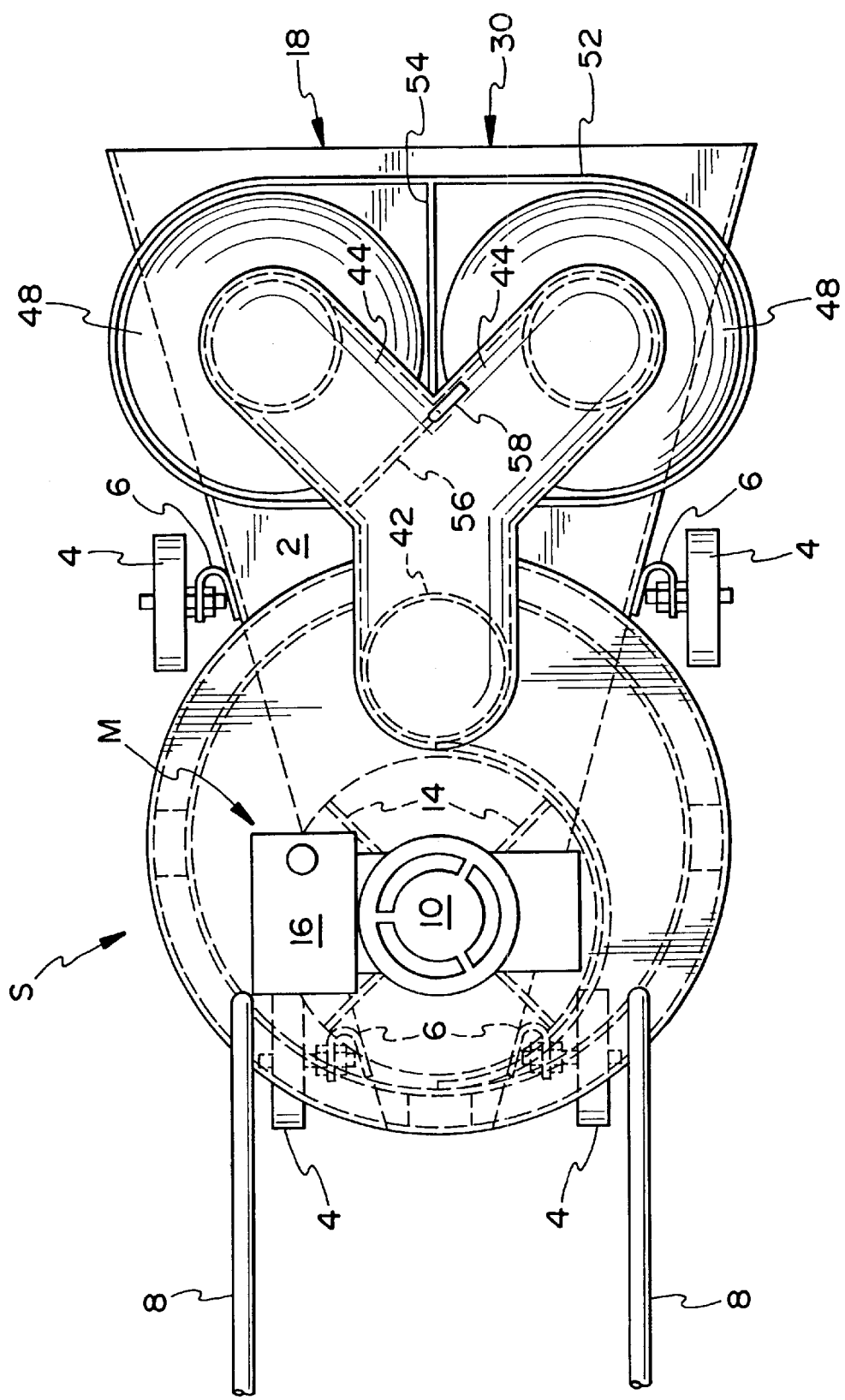
FIG. 2 is a top planned view with portions shown in phantom lines.
Figure 3:
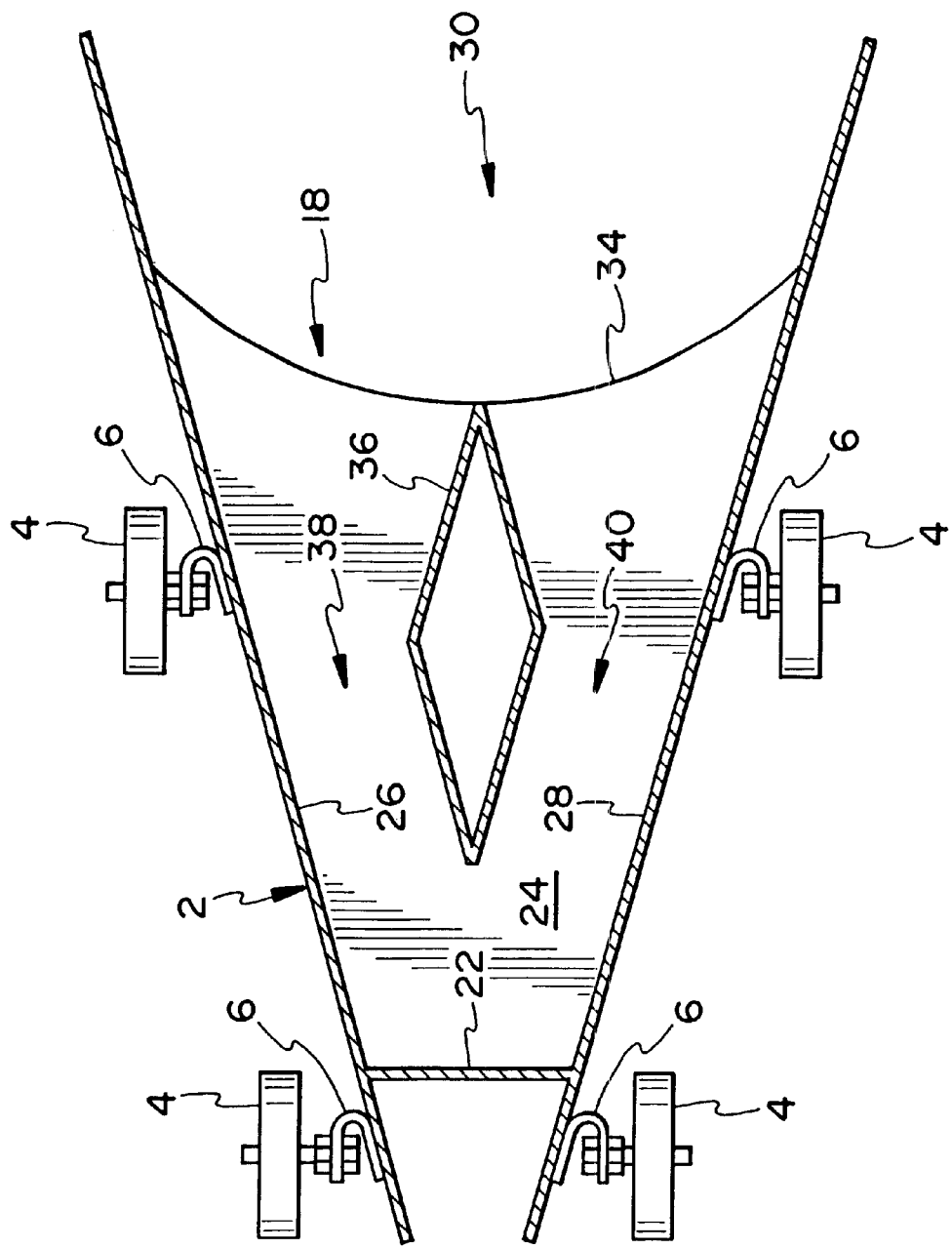
FIG. 3 is a cross sectional view taken along the lines of 3—3 of FIG. 1 and viewed in the direction of the arrows.
Figure 4:
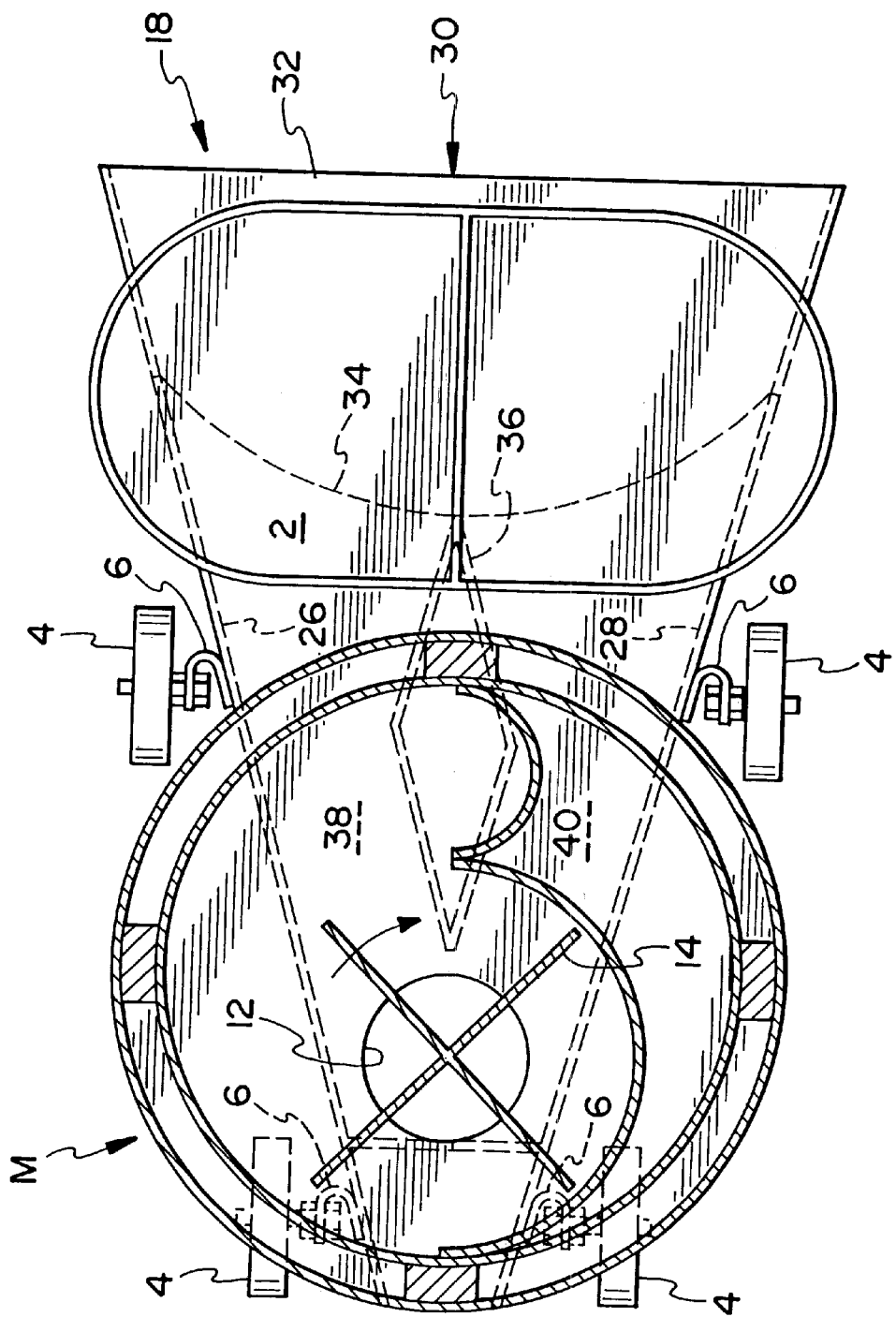
FIG. 4 is a cross-sectional view taken along the lines of 4—4 in FIG. 1 and viewed in the direction of the arrows.

In FIGS. 1 and 2 the lawn sweeper S includes a platform 2 provided with wheels 4 mounted on wheel brackets 6. The sweeper S includes a push handle 8 only partially shown in the FIGS. 1 and 2. Mounted on the platform 2 is a suction-blower motor assembly M which includes a motor 10. As best shown in FIG. 4, a circular opening 12 is provided in the platform 2 leading into the suction-blower motor assembly M. The motor 10 drives a fan 14. The motor 10 has as associated therewith a gasoline tank 16. The leaf or debris pickup 18 includes a top 20, a rear 22, a bottom 24, and sides 26 and 28 which form a mouth 30. The front edge 32 of the leaf or debris pickup 18 extends forward of the bottom edge 34 of the leaf or debris pickup 18. The bottom edge 34 is of concave configuration whereas the front edge 32 is generally straight. The bottom edge 34 is concave to enhance the flow of material into the leaf or debris pickup 18. In the leaf or debris pickup 18, is positioned a diamond configured wedge 36. The diamond wedge 36 extends along the travel axis of the lawn sweeper S in an elongated fashion and provides two passageways 38 and 40 as best shown in FIGS. 3 and 4. The diamond wedge 36 provides a Bernoulli Effect increasing the speed of the debris flowing through the leaf or debris pickup 18 toward the circular opening 12 into the suction-blower motor assembly M.

As best shown in FIGS. 1 and 2, a first duct 42 extends vertically from the suction-blower motor assembly 14 and connects to at least one second duct 44 which has an outward flange 46 at the end thereof for securing a bag 48 thereto by a drawstring or the like on the bag 48.

As shown in FIG. 2, the first or main duct 42 splits into a pair or secondary ducts 44 each of which is designed to have an outward flange 46 to support a bag 48 secured by a drawstring 50. On the front of the platform 2 is a bag positioner 52 which may include a partition 54 for separating bags 48 as best shown in FIG. 2. The bag positioner 52 should not project upwardly any great distance to permit easy positioning of the bags 48 or ease and removal from the outward flange 46.

Between the first duct 42 and the second ducts 44 is a flap valve 56 with a handle 58. The handle 58 can swing the flap valve 56 from one side to the other shutting off one of the secondary ducts 44 permitting selectivity of the bags to be filled. Maintaining the flap valve 56 in a neutral position between the ducts would allow the debris to fill both bags 48 simultaneously though not as fast. It will be obvious that the bags 48 will be porous to allow the air to escape as the material flows into the bags 48.

As will be noted in FIG. 1, the first duct 42 and second ducts 44 are of a loop configuration.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A lawn sweeper comprising:
    a) a platform having a front, rear sides and an axis of travel;
    b) said platform supported by front and rear wheels;
    c) a leaf pick-up mounted beneath said platform;
    d) a suction-blower motor assembly including a motor mounted on said platform rear above said leaf pick-up;
    e) said leaf pick-up connected to said suction-blower motor assembly;
    f) a pair of passageways in said leaf pick-up leading to said suction-blower motor assembly;
    g) said leaf pick-up having top, bottom, side and rear walls forming at said platform front a debris intake having a mouth;
    h) said leaf pick-up extending lengthwise of said axis of travel from said debris intake mouth to said platform rear and said suction-blower assembly;
    i) said leaf pick-up having a wedge-shaped baffle forming said pair of passageways;
    j) said baffle having a front end extending in the direction of said mouth for creating a Bernoulli Effect in said pair of passageways upon operation of said suction-blower motor assembly;
    k) said suction-blower motor assembly including a main duct in front of said motor;
    l) said main duct extending in a forward direction of the platform axis of travel and having at least one secondary duct forward of said motor and having means for securing a debris pick-up bag thereto in front of said suction-blower motor assembly;
    m) whereby when said suction blower motor assembly is operated and a bag secured to said at least one blower end, the debris will be sucked into said leaf pick-up and thence into said suction blower motor assembly and blown into said main duct and propelled into a bag secured to said at least one blower end.

2. A lawn sweeper as in claim 1 and including;
    a. a bag positioner mounted on said platform front.

3. A lawn sweeper as in claim 1 and including:
    a. a pair of said secondary ducts branching from said main duct and each having said means for securing a debris pick-up bag thereto.

4. A lawn sweeper as in claim 3 and including:
    a. a bag positioner mounted on said platform front; and
    b. said bag positioner having means for holding debris pick-up bags adjacent each other.

5. A lawn sweeper as in claim 4 and including:
    a. A flap valve associated with said main and secondary ducts for alternating flow of debris into one of said debris pick-up bags at a time.

6. A lawn sweeper as in claim 1 and including:
    a. a push handle mounted on said lawn sweeper.

7. A lawn sweeper as in claim 1 and wherein:
    a. said bag positioner extends upwardly towards said secondary ducts blower end.

8. A lawn sweeper as in claim 1 and wherein:
    a. said debris intake mouth includes a top front edge and a bottom front edge, and
    b. said top front edge extending forward of said bottom front edge, and
    c. said bottom front edge including leading and trailing edges.

9. A lawn sweeper as in claim 8 and wherein:
    a. said bottom front edge is concave.

10. A lawn sweeper as in claim 1 and wherein:
    a. said wedge-shaped baffle extends short of said bottom front edge.

11. A lawn sweeper as in claim 1 and wherein:
    a. said wedge-shaped baffle is diamond shaped.

12. A lawn sweeper as in claim 11 and wherein:
    a. said wedge-shaped baffle is elongated in the axis of travel of said platform.

13. A lawn sweeper comprising:
    a) a platform having a front, rear sides and an axis of travel;
    b) said platform supported by front and rear wheels;
    c) a leaf pick-up mounted beneath said platform front;
    d) a suction-blower motor assembly including a motor mounted on said platform rear above said leaf pick-up;
    e) said leaf pick-up connected to said suction-blower motor assembly;
    f) a pair of passageways in said leaf pick-up leading to said suction-blower motor assembly;
    g) said leaf pick-up having top, bottom, side and rear walls forming a debris intake having a mouth;
    h) said leaf pick-up having a wedge-shaped baffle forming said pair of passageways;
    i) said baffle having a front end extending in the direction of said mouth for creating a Bernoulli Effect in said pair of passageways upon operation of said suction-blower motor assembly;
    j) said suction-blower motor assembly including a main duct in front of said motor;
    k) said main duct extending in a forward direction of the platform axis of travel and having at least one secondary duct forward of said motor and having means for securing a debris pick-up bag thereto in front of said suction-blower motor assembly;
    l) said main and secondary ducts form a vertical loop; and
    m) whereby when said suction blower motor assembly is operated and a bag secured to said at least one blower end, the debris will be sucked into said leaf pick-up and thence into said suction blower motor assembly and blown into said main duct and propelled into a bag secured to said at least one blower end.

* * * * *